United States Patent [19]
Brecht

[11] Patent Number: 5,593,797
[45] Date of Patent: Jan. 14, 1997

[54] ELECTRODE PLATE CONSTRUCTION

[75] Inventor: William B. Brecht, Seal Beach, Calif.

[73] Assignee: Trojan Battery Company, Santa Fe Springs, Calif.

[21] Appl. No.: 104,098
[22] PCT Filed: Feb. 24, 1993
[86] PCT No.: PCT/US93/01714
 § 371 Date: Aug. 9, 1993
 § 102(e) Date: Aug. 9, 1993
[87] PCT Pub. No.: WO94/19836
 PCT Pub. Date: Sep. 1, 1994
[51] Int. Cl.⁶ .................................................. H01M 4/70
[52] U.S. Cl. .................... 429/210; 429/185; 429/238; 429/245; 29/2; 427/208.2; 427/327
[58] Field of Search .................................. 429/210, 238, 429/245, 185; 29/2, 623.2; 427/208.2, 327

[56] References Cited

U.S. PATENT DOCUMENTS 2,694,099  11/1954  Zahn .
4,098,967  7/1978   Biddick et al. ................... 429/210
4,761,356  8/1988   Kobayashi et al. ............ 429/245 X
4,939,051  7/1990   Yasuda et al. ..................... 429/245
5,139,902  8/1992   Drews et al. .................... 429/245 X Primary Examiner—Stephen Kalafut
Attorney, Agent, or Firm— Christie, Parker & Hale, LLP

[57] ABSTRACT

A battery electrode (12) for use in an electrolytic bipolar battery (10) comprises a structurally rigid and electrically conductive core member (18), at least one corrosion resistant layer (20), an interface layer (22), a positive-side active layer (14) and a negative-side active layer (26). The corrosion resitant layer (20) is in intimate contact with and is interposed between one surface of the core member (18) and the interface layer (22). The corrosion resistant layer is comprised of a material which can participate in a corrosive electrochemical reaction with the material of the positive active layer, but does so less effectively than does the interface layer. The interface layer (22) is in intimate contact with and is interposed between the corrosion resistant layer (20) and the positive-side active layer (14). The negative-side active material (26) is in intimate contact with the surface of the core member opposite the core member surface carrying the corrosion resistant layer. The margins of the electrode are connected to nonconductive components (30) of the battery which space plural ones of the electrodes from each other. Those connections are made via marginal surface portions (40) of the electrodes from which oxides (36) have been removed. The connections form seals which are secure from leakage of electrolyte through the seals.

34 Claims, 7 Drawing Sheets

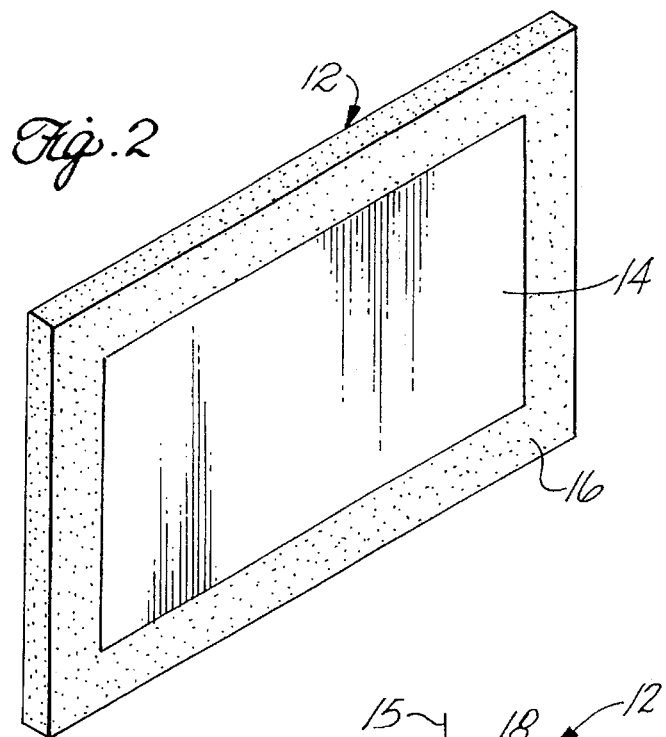
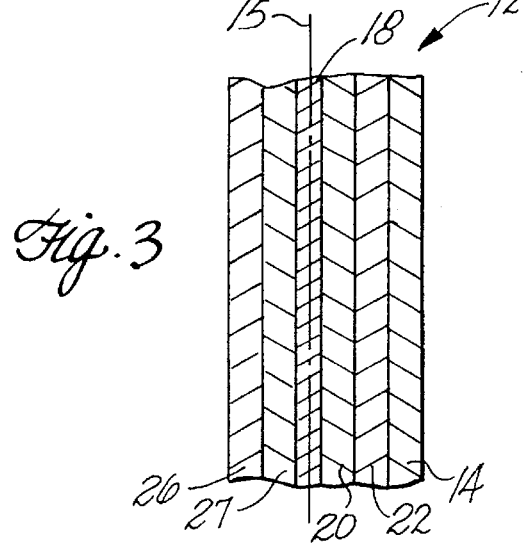
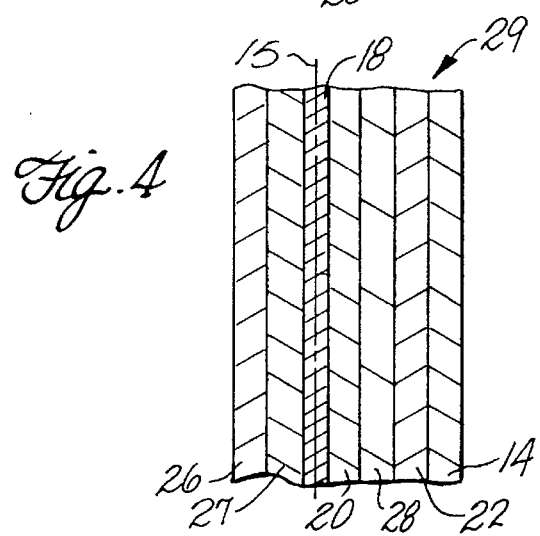

ELECTRODE PLATE CONSTRUCTION

FIELD OF THE INVENTION

This invention relates to the construction of a battery electrode plate that is resistant to chemical attack and corrosion, and provides an electrolyte-tight seal.

BACKGROUND OF THE INVENTION

Even though there has been considerable study of alternative electrochemical systems, the lead-acid battery is still the battery of choice for general purposes such as starting a vehicle, boat or airplane engine, emergency lighting, electric vehicle motive power, energy buffer storage for solar-electric energy, and field hardware, both industrial and military. These batteries may be periodically charged from a generator or other source of suitable DC power.

The conventional lead-acid battery is a multi-cell structure. Each cell generally comprises a set of vertical interdigitated monopolar positive and negative plates formed of lead or lead-alloy grids containing layers of electrochemically active pastes or active materials. The paste on the positive electrode plate when charged comprises lead dioxide ($PbO_2$), which is the positive active material, and the negative plate contains a negative active material such as sponge lead. An acid electrolyte based on sulfuric acid is interposed between the positive and negative plates.

Lead-acid batteries are inherently heavy due to the use of the heavy metal lead in constructing the plates. Modern attempts to produce light-weight lead-acid batteries, especially in the aircraft, electric car and vehicle fields, have placed their emphasis on producing thinner plates from lighter weight materials used in place of and in combination with lead. The thinner plates allow for the use of more plates for a given volume, thus increasing the power density of a conventional lead-acid battery. However, the extent to which conventional battery performance can be improved upon is limited by its inherent construction.

Bipolar batteries are not new and have been known for some time and offer the potential for improvement over monopolar battery technology. Bipolar battery construction comprises a series of electrode plates that each contain a negative active material on one side and a positive active material on the other side, hence the terms "bipolar" and "biplate". The biplates are serially arranged in such a fashion that the positive side of one plate is directed toward the negative side of an opposing plate. The bipolar battery is made up of separate electrolytic cells that are defined by biplates of opposing polarities. The biplates must be impervious to electrolyte and be electrically conductive to provide a serial connection between cells.

The bipolar battery is characterized by having improved current flow over that of conventional monopolar batteries. The enhanced current flow is the result of through-plate current transfer from one polarity of the biplate to the other. In a conventional monopolar battery the current must travel from one electrode plate to another of opposite polarity via a conductive path which commonly is circuitous and of relatively considerable length. The significantly shortened intercell current path inherent in the bipolar battery reduces the battery's internal resistance, making it more efficient than the conventional monopolar battery in both discharging and charging modes of operation. This reduced internal resistance permits the construction of a bipolar battery that is both smaller and lighter than its equivalent monopolar battery, making it a highly desirable alternative for use in the aircraft, military and electric vehicle industry where considerations of size and weight are of major importance.

The bipolar battery, however, is not without its own difficulties and problems which, heretofore, have resisted efficient resolution and solution. A first such difficulty is related to the choice of materials for the conductive sheet used to make up the biplate. The bipolar construction in its simplest form would use lead or lead alloy for the conductive sheet and intercell partition. However, since the lead of the conductive sheet is corroded at the positive (anode) side by both the action of overcharge (recharge) and by the current-producing interaction between the conductive sheet and the active material itself (discharge), in time the lead sheet will be corroded entirely through from the positive side. Once penetrated, the electrolyte from the cell on the positive side has direct contact with the electrolyte on the negative side and a short circuit is established between adjacent cells. In short order, the positive material on one side of the now-penetrated conductive sheet becomes fully discharged against the negative active material on the opposite side.

This short circuit condition will result not only in a loss of voltage from the two cells, but will also introduce a very high resistance in the series-connected bipolar cells due to the near total conversion of both active materials to lead sulfate, which is nonconducting. The greatly increased resistance will render the battery nearly useless at all but very low discharge rates and will entirely defeat the fundamentally low resistance inherent in bipolar construction.

Another problem in the construction of the bipolar battery is one inherent with the construction of lead-acid batteries in general. This involves achieving an electrolyte-tight seal about a conductive battery member passing from a position inside the battery and in intimate contact with the battery electrolyte through the battery housing to the battery's outside surface. In a conventional monopolar lead-acid battery, problems of unwanted electrolyte leakage occurs at the terminal post seal where a terminal post (conductive member) passes through the battery cell cover. The unique electro-chemistry occurring at such seal interface predicts that a true seal cannot be obtained so long as an oxide film exists on the conductive member. Eventually the seal will fail either by creep corrosion, resulting in the migration of the electrolyte to the battery surface, or around the end of the conductive member to the adjacent cell, or fail by crevice corrosion (also called nodular corrosion) resulting in the mechanical separation or failure of the seal.

The problem related to achieving an electrolyte-tight seal about a conductive battery member in intimate contact with the battery electrolyte as the conductive member passes through the battery housing is well known and understood in the art and was addressed in a paper entitled "Vulcanized Rubber Post Seal For Lead-Acid Batteries A New Generic Type" presented before the 1988 INTELEC International Telecommunications Energy Conference. The paper identified two different types of corrosion mechanisms, creep and crevice or nodular corrosion, that was responsible for electrolyte migration in electrolytic batteries.

In bipolar battery construction, a bipolar plate is the conductive member which is in intimate contact with the battery electrolyte. The bipolar plate extends from its position in contact with the electrolyte to a position at its edges where it is sealed to a barrier between adjacent cells; it may extend to an exterior surface of the battery. At the position defining the battery surface the biplate must interact with other battery components to form an electrolyte-tight seal.

The problem of achieving an electrolyte-tight seal is exacerbated in bipolar construction because the electrolyte-tight seal must occur about the full perimeter of each biplate, making the total area of seal much greater than that encountered in conventional monopolar battery construction.

It is seen, therefore, that a need exist for a bipolar battery electrode plate construction that will afford improved protection from chemical and electrolytic attack, serving to both extend battery service life and improve the predictability of battery performance. It is desirable that the electrode plate be constructed using methods commercially and economically feasible from materials readily and practically available. It is also desirable that the electrode plate construction facilitate the reclamation and recovery of recyclable materials used in battery construction. Further, it is highly desirable that the battery electrode plate be constructed in a manner facilitating an electrolyte-tight seal when used in conjunction with other battery members.

SUMMARY OF THE INVENTION

This invention addresses and fulfills the need identified above. It does so by providing an electrode plate structure for a bipolar battery which is of reduced weight and has a long life expectancy. The bipolar electrode and the overall battery are manufacturable by economic and efficient procedures. The battery materials are well known and readily amendable to established reclamation and recycling process. The electrode can be sealed to other battery components in a manner which effectively resists leakage during the useful life of the battery.

Generally speaking, in terms of structure, this invention provides an electrode construction for an electrolytic bipolar battery, which construction includes a structurally rigid and electrically conductive core member. At least one corrosion resistant layer, comprising a material which is both corrosion resistant and able to participate in the electrochemical reaction, is in intimate interface with the surface of the conductive core member. An interface layer, comprising a material that both substantially participates in the electrochemical reaction and fuses or forms an intimate interface with a positive-side active material, is in intimate interface with the surface of the corrosion resistant layer. A positive-side active layer, comprising a material that is capable of substantial participation in the electrochemical reaction at the anodic or positive side of the electrode plate, is in intimate interface with the surface of the interface layer. A negative-side active layer, comprising a material that is capable of substantial participation in the electrochemical reaction at the cathodic or negative side of the electrode plate, is in intimate interface with the surface of the conductive core member opposite the core member surface accommodating the corrosion resistant layer.

The electrode plate may comprise a single corrosion resistant layer or a plurality of corrosion resistant layers. With respect to an electrode plate comprising more than one corrosion resistant layer, each corrosion resistant layer can exhibit a decreased degree of corrosion resistance and an increased degree of participation in the electrochemical reaction as a function of distance from the electrode core member. A preferred corrosion resistant layer may comprise pure lead or a lead-alloy selected from the group consisting of lead-tin, lead-indium, lead-calcium, lead-silver, lead-aluminum, and lead-antimony or any combination thereof.

With respect to the interface layer, a preferred material may comprise either pure lead or a lead-alloy selected from the group consisting of lead-tin, lead-indium, lead-calcium, lead-silver, lead-aluminum, and lead-antimony or any combination thereof. With respect to the positive-side active layer, a preferred material is lead dioxide. With respect to the negative-side active layer, a preferred material is sponge lead.

The corrosion resistant layers and interface layer are applied by metal cladding or similar process which results in the formation of metallurgical bonds between the layers. The positive-side and negative-side active materials are applied to respective sides of the electrode plate by conventional application methods well known by those skilled in the art.

The electrode plate is a conductive battery member which can extend from a position within the battery in intimate contact with the battery electrolyte, through a seal zone defined by another battery component or the battery housing and to the outside battery surface. The conductive battery member is prepared for use in forming an electrolyte-tight seal by striping the oxides away from a portion of the surface of the conductive battery member that lies within the seal zone. In a non-oxidizing atmosphere, the deoxidized conductive surface is coated with a protective layer that is oxygen impermeable, chemically and electrochemically stable, and capable of joining with the battery housing or nonconductive battery component to form an electrolyte-tight seal. The battery is constructed, and an electrolyte-tight seal is achieved, by placing the protected portion of the conductive member within the seal zone and causing the protected portion of its surface to intimately mate with and connect to another battery component or the battery housing.

DESCRIPTION OF THE DRAWINGS

The above-mentioned and other features of this invention are set forth in the following detailed description of the presently preferred and other embodiments of the invention, which description is presented with reference to the accompanying drawings wherein:

FIG. 2 is a perspective view of an electrode plate as provided in the practice of this invention;

FIG. 3 is a cross-sectional view of one embodiment of the electrode plate;

FIG. 4 is a cross-sectional view of one another embodiment of the electrode plate;

DETAILED DESCRIPTION

Figure 1:
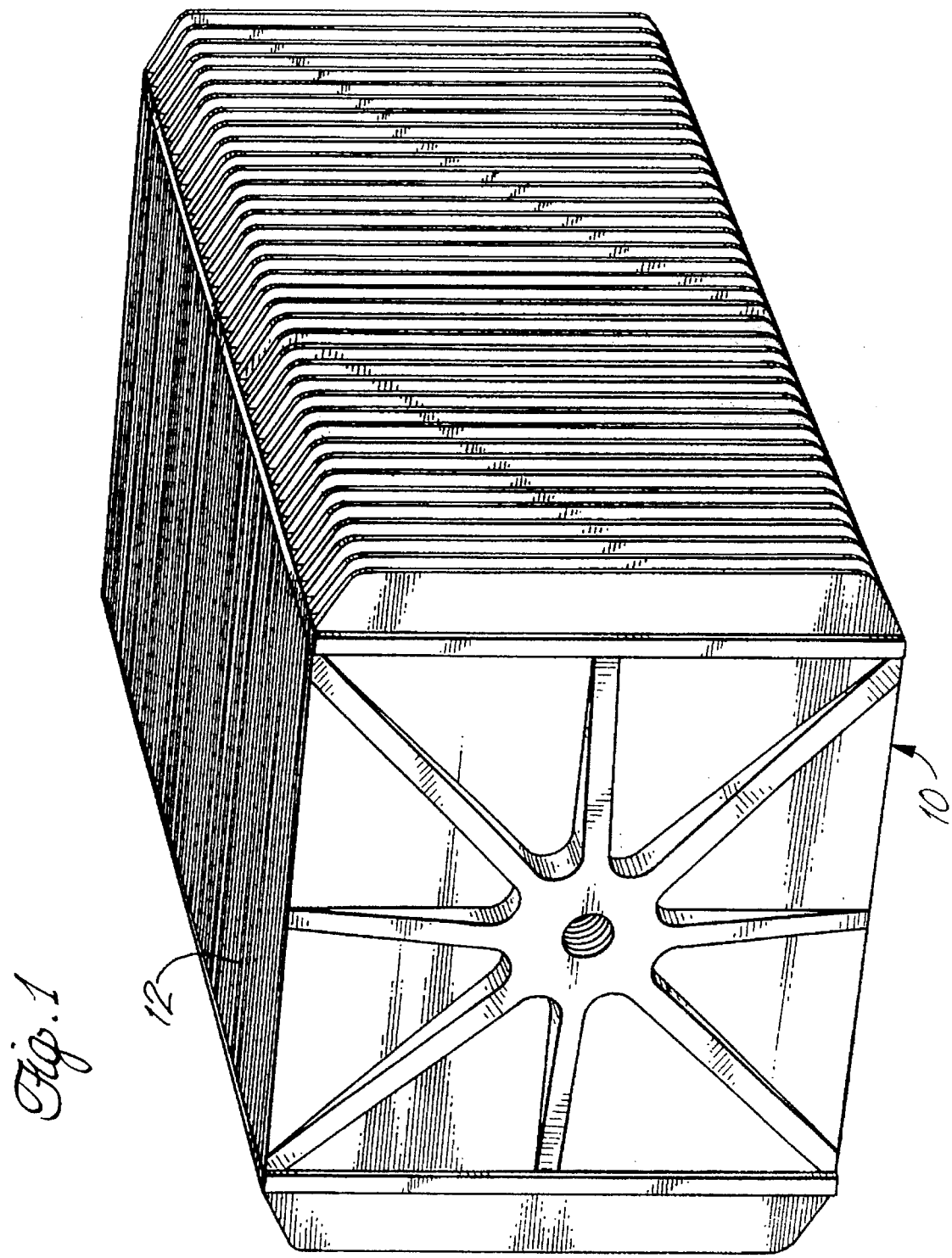
FIG. 1 is a perspective view of a bipolar battery comprising the electrode plate provided in the practice of this invention.

The construction of an electrode plate for use in a battery is generally not a large concern when the battery is a conventional monopolar lead-acid type battery. In the conventional lead-acid battery, each positive and negative electrode plate is typically made from lead. Each electrode is of only one polarity on each of its sides, hence the name monopolar. Lead and alloys of lead are chosen as the preferred electrode material for two reasons. First, it has an ability to participate in the electrochemical reaction that creates the flow of electrons or current flow of the battery. Second, it has an ability to fuse with and form an intimate contact with the active material at the surface of the electrode plate. The positive and negative electrodes in a conventional battery are arranged in a repeating pattern of negative and positive plates separated by a nonconductive member. The plates are immersed in an acid electrolyte which facilitates the ion transfer and electrochemical reaction between plates of opposing polarities. A cell in a conventional monopolar battery comprises a group of electrode plates, a volume of electrolyte, and a cell partition usually made from a nonconductive/chemically inert polymeric material.

The construction of a bipolar battery involves the placement of an electrically conductive sheet between adjacent cells of the battery such that separation of the electrolyte in the respective cells is maintained by the conductive sheet. Positive active material is applied to one side of the sheet, while negative active material is applied to the opposite side. In this way, the positive active material is exposed to the electrolyte of one cell and the negative active material is exposed to the electrolyte of the adjacent cell. The conductive sheet thereby forms a single structure electrically connecting two adjacent half cells, one positive and one negative. By repeating this arrangement of conductive sheets separating successive cells, a battery of any desired voltage can be constructed simply by building up the required number of cells into a stack.

In its simplest form, the conductive sheet between the cells to which the active materials are applied can be metallic lead or lead alloy, as is true with conventional monopolar lead-acid batteries. The only requirement which must be observed is that the sheet be truly continuous (without holes) and be sealed at its perimeter to preclude contact between the electrolyte of adjacent cells along paths around the edges of the electrode. The conductive sheet in a bipolar battery serves multiple functions in the completed cell: that of intercell partition, and that of current collector for active materials in each of the adjacent cells. Because the electrically conductive sheet holds or is in contact with active materials of both positive and negative polarity, it is said to be bipolar (or two poles). When this construction method is utilized, the conductive sheet with both active materials attached is called a biplate, and the stacked series of biplates is called a bipolar battery.

An advantage of bipolar batteries over conventional monopolar batteries lies in the reduction of internal resistance which is directly related to its construction. In a conventional monopolar battery the electron transfer generated by the electrochemical reactions occurring at the active surfaces of each electrode must progress through the active material of each electrode, through a conductor to a plate of opposite polarity in an adjacent battery cell, and then through the active material of that plate in merely moving from one cell to the next within the battery; that path is then repeated, on average, as an electron moves from cell to cell in a monopolar battery before reaching the battery negative terminal where it is available for use as electric current. The total electron path in a monopolar battery can be quite long. This path of current flow is characterized by an inherent resistance (lead is not highly conductive) which causes a reduction in the current output of the battery.

Because of the bipolar nature of each electrode plate in a bipolar battery, the electron transfer occurs through the thickness of the biplate. The biplate thickness is many times smaller than the intercell electron path length in a monopolar battery, decreasing the internal resistance of the bipolar battery. This reduced internal resistance permits the construction of a bipolar battery that is both smaller and lighter than its equivalent monopolar battery, making it a highly desirable alternative for use in the aircraft, military and electric vehicle industry where considerations of size and weight are of major importance.

The biplate of a bipolar battery is required to serve many different functions. The biplate must: (1) participate in the electrochemical reaction causing the evolution of free electrons, (2) serve as a cell partition, preventing the migration of electrolyte between adjacent cells, (3) intimately and effectively support the relevant active materials of a battery cell, (4) conduct electricity as efficiently as possible, and (5) due to the inherent construction of the bipolar battery, cooperate with other battery components to form an electrolyte-tight seal about the biplate edges which may be on the battery's outside surface. Therefore, the material chosen for the biplate is an important consideration in the construction of an effective, long lasting bipolar battery.

There are many factors which influence the materials suitable for use as battery electrode plate. For example, the electrode plate must be both structurally rigid to support the active surface during the life of the battery, and it must be chemically and electrochemically stable as well. Lead and certain alloys of lead are not well suited for use as biplates in a lead acid bipolar battery, even though they have superior ability to fuse with and support positive and negative active materials for such batteries. Lead at the positive side of the biplate is corroded both by the action of overcharge and by the very interaction with the active material, lead dioxide ($PbO_2$) which is essential to the current creation process. Thus, in time, a lead biplate would be corroded entirely through from the positive side. Once the biplate is penetrated, the electrolyte from the positive side of the biplate will come in direct contact with electrolyte at the negative side and a short circuit will be established between adjacent cells, thereby causing the positive active material on one side of the biplate to be rapidly fully discharged against the negative active material on the opposite side. That short circuit will greatly increase the internal resistance of the battery.

To preclude the failure of an entire stack of bipolar cells due to corrosion penetration of one conductive intercell partition, it is necessary that the partition include a conductive material which is sufficiently chemically resistant to the action of strong acids and electrochemically resistant to the action of oxidation so that through-corrosion of the partition cannot occur within the life of other components of the battery. Only relatively recently have materials which met the criteria of being conductive but completely chemically inert become available in the form of conductive polymers. However, such polymers are unsuited for use as a conductive material in the construction of a bipolar battery because they are unable to withstand the electrochemical oxidation action that occurs at the positive-side active material and are unable form a bond with and intimately interface with the battery active material.

In the conventional monopolar lead-acid battery construction, the establishment of a satisfactory boundary layer interface between the active material and the current collector relies upon a complex chemistry of intermediate oxides and corrosion products produced from the metallic current collector itself. Corrosion of the current collector, then, is a necessary prerequisite for making and maintaining contact between the conductive sheet of the biplate and the active material, particularly at the positive side. If non-corroding materials are used to fabricate the conductive intercell partition of a bipolar battery, then the corrosion necessary for satisfactory interface between the conductive partition and the active material would not be formed and, consequently, electrical performance would not be realized.

An electrode plate 12 (FIG. 2) constructed according to the present invention is used in the construction of a bipolar battery 10 shown in FIG. 1. In that bipolar battery, the electrode plates (biplates) are stacked in serial fashion, progressing from the front to the rear of the battery, defining both the length and the cross-sectional shape of the battery. FIG. 1 illustrates an embodiment of the bipolar battery having bipolar plates shaped in the configuration of a square or rectangle, but other plate configurations, such as a circle, oval, hexagon and the like, can be used if desired.

FIGS. 2 and 3 illustrate a preferred embodiment of electrode plate 12 according to the present invention. The electrode plate comprises a positive-side active material 14 at the surface of its positive side. A protective coating 16 surrounds the edge and periphery of both the negative and positive sides of the electrode plate. As shown in FIG. 3, biplate 12 comprises a core member 18 that serves as a structurally rigid conductive member for the electrode plate. With respect to the positive (anodic) side of the electrode plate to the right of dashed line 15, a corrosion resistant layer 20 is in intimate contact with the core member 18. The corrosion resistant layer 20 is interposed between the core member and an interface layer 22 capable of both substantial participation in the desired electrochemical reaction and of fusing and forming an intimate interface with the positive-side active material 14. The interface layer 22 is interposed between the corrosion resistant layer 20 and the positive-side active material 14. The positive-side active layer occupies the positive-side surface of the electrode plate and is fused to or intimately carried by the interface layer 22. With respect to the negative (cathodic) side of the electrode to the left of dashed line 15, a negative-side active material 26 is carried in intimate relation by an adjacent face of a cathode liner 27 which covers the cathodic side of core member 18.

With respect to electrode core member 18, it is desired that it be structurally rigid, electrically conductive and facilitate the reclamation and recovery of recyclable materials used to construct the battery. It is not necessary that the core member be chemically or electrochemically stable as previously required in bipolar battery construction. The reason for this is that the corrosion resistant layer 20 protects the core member from corrosion by chemical and electrochemical processes during the useful life of the battery 10.

Suitable materials for electrode core member 18 may include known metals and metal alloys such as carbon steel, copper, aluminum, iron, stainless steel and the like. However, other materials such as graphite prepreg, ceramics, and carbon based materials as well as conductive polymers such as metal epoxies, metal polyolefins, metal thermoplastics, metal thermosets, and metal polycarbonates, polymer composites with conductive additives of $SnO_2$, $Ti_4O_7$, and graphite/carbon particulate or fiber and the like may also be used. These and other suitable core materials may contain the conductive metal material in the form of either grains or fibers. In general, any type of material that possesses the requisite structural strength and the ability to conduct electricity can be used to make the core member of the present invention. Materials having high ratios of strength to weight are preferred.

Preferred core member materials include carbon steel, iron and aluminum. A particularly preferred material is carbon steel because it is readily reclaimable and recyclable. Although the use of aluminum would be advantageous because of its relatively light weight, its use would adversely affect the ability to reclaim and recover the recyclable the materials otherwise used in constructing the battery 10. As illustrated in FIG. 2, the core sheet can be configured as a rectangular flat of a given thickness. However, the particular size of the core sheet is ultimately dependant on its particular application. For instance, a core sheet may be configured to accommodate its use in an electric wrist watch, calculator, or camera. At the other extreme, a core sheet may be configured to accommodate its use in a submarine or commercial airplane. As an example, a core sheet used to power an electric vehicle can be configured in the shape of a rectangle having approximate dimensions of 25 by 20 centimeters and a thickness in the range of from 0.2 to 0.8 millimeters. A particularly preferred electrode core member may have a thickness of approximately 0.4 millimeters. Although the preferred shape of the core member is rectangular, other configurations such as square, round, oval, hexagonal and the like may also be used. In addition, the core member may be configured other than at a flat sheet; for example, the core member may be corrugated for strength and rigidity or for other reasons.

As to the layer 20 of corrosion resistant material, it is desired that this material be chosen from a class of materials which is corrosion resistant to some extent and which participates in the battery's positive electrochemical reaction to some extent. It is desired that the corrosion resistant layer exhibit simultaneous properties of corrosion resistance and electrochemical participation in an inversely related manner. For example, a corrosion resistant material having high corrosion resistant properties should display a low degree of electrochemical participation.

These simultaneous characteristics and their inverse relationship is particularly desirable to assure a gradual increase in the corrosion penetration resistance of the electrode plate, moving from the active material to the core member, to prevent the sudden corrosive penetration of the core member and the resulting sudden decrease in battery performance. The corrosion resistant layer is interposed between core member 18 and the substantially less corrosion resistant layer 22 which actively participates self-destructively in the desired electrochemical processes with active material 14 in the presence of an electrolyte from which core member 18 is protected by layer 20. Layer 22 is a corrodible layer. When the corrodible layer is penetrated by the battery electrolyte, as it necessarily will be in due course as a consequence of use of the battery, the electrolyte will interact with the less active corrosion resistant layer, providing a heightened degree of corrosion penetration resistance to the core member.

With respect to lead-acid batteries and the related electrochemical reaction, a material comprising lead provides the degree of electrochemical participation desired. The concurrently desired corrosion resistant characteristic may be acquired by using a lead alloy comprising a material that is both chemically compatible with lead and corrosion resistant when alloyed with lead. Preferred materials for constructing the corrosion resistant layer may comprise pure lead or a lead alloy selected from the group consisting of lead-indium, lead-calcium, lead-tin, lead-silver, lead-aluminum, and lead-antimony or any combination thereof. Other alloying agents such as polonium, copper, arsenic, sulfur, cadmium, bismuth, and zinc may be added to the chosen lead alloy in order to change the physical properties of the corrosion resistant layer. A preferred corrosion resistant layer may comprise up to approximately 0.1 percent by weight of these additional alloying agents.

A particularly preferred material for constructing corrosion resistant layer 20 is one comprising lead-tin (PbSn) alloy. Lead-tin alloy is particularly preferred because of its low relative cost and its ready availability. A lead-silver alloy would provide the best corrosion resistance, but it has relatively high material cost. A preferred lead-tin alloy comprising lead-tin comprises in the range of from 0.01 to 5 percent by weight tin and has a thickness in the range of from 0.04 to 0.2 millimeters. A lead-tin alloy comprising less than 0.01 percent by weight tin will not exhibit the degree of corrosion resistance desired to protect the core member from chemical and electrochemical attack. A lead-tin alloy comprising greater than 5 percent by weight tin will not participate in the electrochemical reaction to the degree desired to maintain optimal battery performance upon exposure with the battery electrolyte. A particularly preferred corrosion resistant layer comprises approximately 2 percent by weight tin and has a thickness of approximately 0.08 millimeters. In order to achieve enhanced corrosion protection a small amount of silver (Ag) in the range of from 0.001 to 1 percent by weight may be added to the lead alloy (i.e., lead-tin) or to any combination of alloys chosen for the corrosion resistant layer. A particularly preferred corrosion resistant layer comprises approximately 0.3 percent by weight silver.

The corrosion resistant layer may be joined to the surface of the core member by using known techniques that causes two materials to intimately interface with and bond to each other including the use of cladding, conductive adhesives, compression welding, hot dip coating, fluid film deposition, and plating or the like. A cladding process is preferred because such a process creates an intimate metallurgical bond between the two dissimilar materials. An intimate bond between the layers of dissimilar materials is desired in order to maximize the conductivity between the layers. If required, the thickness of the composite foil may be readily controlled by conventional rolling techniques.

More than one corrosion resistant layer or thickness may be used when it is desired that the increase in corrosion penetration resistance occurs in a more gradual manner after penetration of layer 22 by the electrolyte; see FIG. 4. Where an additional layer of corrosion resistant material is used as with corrosion resistant layer 20 it is desired that this material be chosen from a class of materials that is both corrosion resistant to a lesser extent than the initial (i.e., adjacent to core 18) corrosion resistant layer 20 and participates in the electrochemical reaction to a greater extent than the initial corrosion resistant layer. In the context of lead-acid batteries and the related electrochemical reaction, a material comprising pure lead provides the degree of electrochemical participation desired. The simultaneous corrosion resistant characteristic may be acquired by using a lead alloy comprising a material that is both chemically compatible with lead and corrosion resistant. Preferred materials for constructing an additional corrosion resistant layer may comprise pure lead or a lead alloy selected from the group consisting of lead-indium, lead-calcium, lead-tin, lead-silver, lead-aluminum, and lead-antimony or any combination thereof. As with the initial corrosion resistant layer 20, the same alloying agents may be added to the chosen lead alloy in the same proportion in order to achieve a particular physical property.

A particularly preferred material for constructing an additional corrosion resistant layer 28 is lead-tin (PbSn) alloy. A preferred lead-tin alloy comprises in the range of from 0.01 to 3 percent by weight tin and has a thickness in the range of from 0.04 to 0.2 millimeters. A particularly preferred additional corrosion resistant layer 28 comprises approximately 1 percent by weight tin and has a thickness of approximately 0.08 millimeters. In order to achieve improved participation in the electrochemical reaction an amount of antimony (Sb) in the range of from 0.2 to 15 percent by weight may be added to the lead alloy (i.e., lead-tin) or any combination of alloys chosen for the additional corrosion resistant layer. A particularly preferred additional corrosion resistant layer comprises approximately 1 percent by weight antimony.

If plural corrosion resistant protective layers for the electrode structural core are to be made from similar lead alloys, the property of decreasing corrosion resistance can be achieved by gradually decreasing the proportion of alloying agent in the material with each additional layer proceeding away from the core toward the side of the electrode where corrosion occurs when the battery is operated in its discharge mode. This explains why, in a preferred embodiment, the initial corrosion resistant layer proximate the core member will comprise a greater proportion of alloying agent than that contained in each subsequent corrosion resistant layer.

Each successive corrosion resistant layer may be joined to the surface of the precursor or previous corrosion resistant layer by using the same process as that used to affix layer 20 to core 18.

An electrode plate of the present invention may comprise as many corrosion resistant layers as desired to simultaneously achieve a more gradual increase in corrosion penetration resistance and decrease in electrochemical reactivity as one proceeds towards core member 18 from the layer of positive-side active material 14. This may be desirable where the electrode plate is to be used in a battery application requiring a high degree of reliability, such as with airplanes, satellites or space vehicles and the like. Each subsequent corrosion resistant layer can contain a progressively smaller proportion of the same alloying agent, such as tin in presently the practice of the invention, preferred embodiment, or different layers can contain different alloying agents in desired concentrations.

For example, an electrode plate may comprise a core member, a first corrosion resistant layer, a second corrosion resistant layer, a third corrosion resistant layer and a forth corrosion resistant layer in succession proceeding from the electrode structural core member towards the positive active material. In such event, assuming that lead-tin is used as the basic alloy, each corrosion resistant layer will have a lesser proportion of alloying agent, i.e., tin, than that of the precursor or prior corrosion resistant layer.

With respect to the layer 22 of interface material capable of substantial participation in the electrochemical reaction with the positive-side active material 14, a material comprising lead provides the degree of electrochemical participation desired for use in a lead-acid battery. An additional requirement, however, is that the interface layer be capable of fusing with and forming an intimate interface with the positive active material used in a lead battery, namely lead dioxide (PbO$_2$). The ability of the interface layer to fuse with and form an intimate interface with the active material is important because the performance of a battery is largely dependant on the ability of the active material surface to both participate with the battery electrolyte in the electrochemical reaction and transfer electrons to the electrode core member. Optimal electron transfer (electrical conductivity) from the active material to the core member is realized when the active material is in intimate interface with the interface layer. Optimal participation of the active material in the electrochemical reaction is realized when the active material is in intimate interface with the interface layer, and thus capable of withstanding the chemical and electrochemical environment of a battery without falling away from the electrode plate.

Therefore, lead-alloys comprising a material capable of fusing and forming an intimate interface with lead dioxide are preferred as the material for electrode layer 14. Preferred materials for constructing the interface layer may comprise pure lead or a lead alloy selected from the group consisting of lead-indium, lead-calcium, lead-tin, lead-silver, lead-aluminum, and lead-antimony or any combination thereof. As with the corrosion resistant layer 20, the same alloying agents may be added in the same proportion to the lead alloy chosen to construct interface layer 22 in order to achieve a particular physical property.

A particularly preferred interface material is lead-antimony (PbSb) alloy. Antimony is the preferred alloying agent due to its ability to corrode while maintaining an intimate interface with the lead dioxide positive-side active material. A preferred lead-antimony alloy comprises in the range of from 0.2 to 15 percent by weight antimony and has a thickness in the range of from 0.06 to 0.3 millimeters. An interface layer comprising less than 0.2 percent by weight antimony will not exhibit the degree of fusion with the active material desired in the construction of an electrode plate. An interface layer comprising more that 15 percent by weight antimony will not exhibit the desired degree of participation in the electrochemical reaction. A particularly preferred interface layer comprises approximately 3 percent by weight antimony and has a thickness of approximately 0.1 millimeters. In order to achieve penetration corrosion resistance an amount of tin (Sn) in the range of from 0.01 to 5 percent by weight may be added to the lead alloy (i,e,. lead-antimony) or any combination of alloy chosen for the interface layer. A particularly preferred interface layer comprises approximately 0.8 percent by weight tin.

The layer 22 of the interface material may be applied to the surface of the adjacent corrosion resistant layer by a cladding process which is preferred for the reasons already stated.

The positive-side active material 14 is chosen to participate substantially in the electrochemical reaction desired on the positive or anodic side of the battery electrode plate. For use in a lead-acid battery system, the preferred positive-side active material comprises lead dioxide (PbO$_2$) paste. The positive-side active material may be applied by conventional methods well known to those skilled in the art to the surface of the interface layer 22.

With respect to the selection of the negative-side active material it is desired that the material chosen participate substantially in the electrochemical reaction taking place on the negative or cathodic side of the battery electrode plate. For use in a lead-acid battery system the preferred negative-side active material comprises sponge lead. As with the positive-side active material, the negative-side active material may be applied by conventional methods to a protective layer 27 on the negative side of the electrode core, the protective layer serving to protect the core material from attack by the electrolyte by chemical and electrochemical processes. The negative side protective layer can be pure lead or any desired lead alloy. Layer 27 preferably is affixed to the core by a metal cladding process. Layer 27 can be relatively thin as it is not attacked or corroded to any significant degree as the battery undergoes discharging and charging processes.

Consistent with the foregoing, FIG. 4 illustrates a preferred embodiment of an electrode plate 29. Electrode 29 comprises a core member 18 that serves as a structurally rigid conductive member for the electrode plate. With respect to the positive (anodic) side of the electrode plate to the right of the dashed line 15, a first corrosion resistant layer 20 (e.g., lead-tin alloy comprising approximately 3 percent by weight tin) is in intimate contact with the core member 18. A second corrosion resistant layer 28 (e.g., lead-tin alloy comprising approximately 1 percent by weight tin) of lessor corrosion resistant and more electrochemical active properties than corrosion resistant layer 20 is in intimate surface contact with layer 20. An interface material layer 22 (e.g., a lead-antimony alloy) having the capacity to both substantially participate in the electrochemical reaction and fuse with or form an intimate interface a the positive-side active material 14 is in intimate surface contact with the surface of layer 28. A positive-side active material 14 (e.g., lead dioxide) forms the surface of the positive side of the electrode plate and is in intimate interface with the surface of material layer 22. At the negative (cathodic) side of the electrode plate to the left of the dashed line, a negative-side active material layer 26 is in intimate surface contact with the adjacent surface of a core protecting layer 27 which is in intimate surface contact with structural core 18 over the whole of the negative side of the core.

Although corrosion resistant layers and an interface layer capable of both substantial electrochemical participation and fusing with or forming an immediate interface with the positive-side active material have been described above as separate and distinct thicknesses of a multi-layered electrode construction, a single thickness of material can be used to achieve the purposes and functions described above. For example, instead of providing separate corrosion resistant and interface layers, an electrode plate may be constructed in which a single layer of differentially alloyed lead is present between a structural core sensitive to the battery electrolyte and the positive active material.

Figure 7:
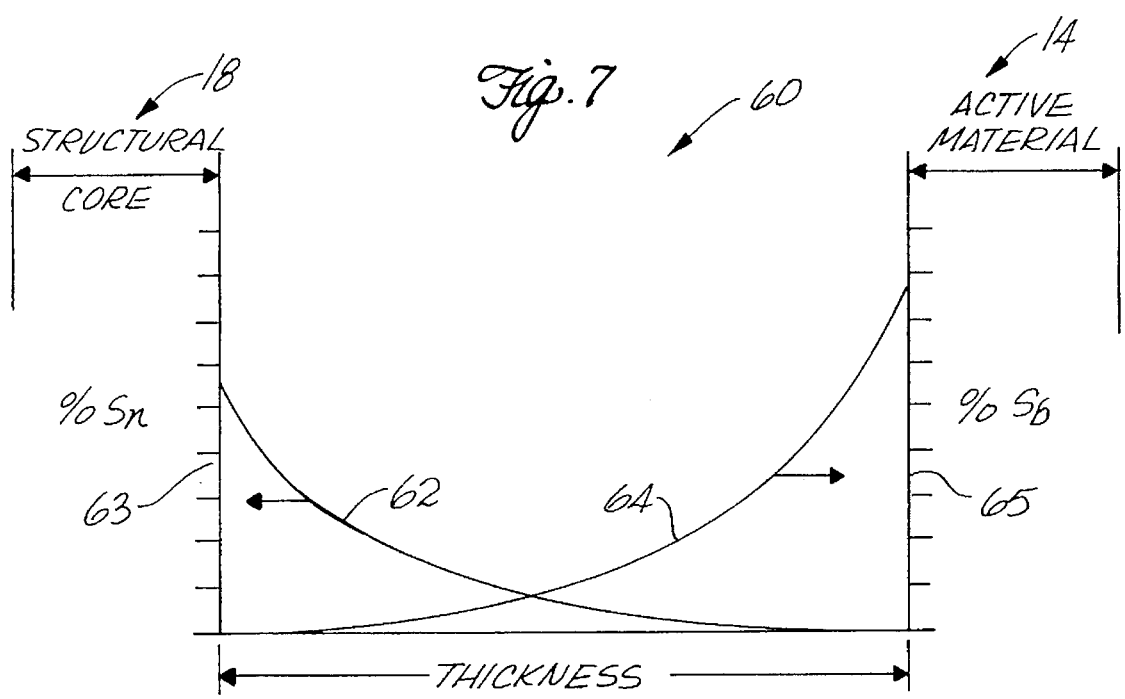
FIG. 7 is a graphic depiction of the variation in composition of a metallic layer interposed between the electrode core member and the positive-side active material in the practice of this invention showing the variation of the material composition through the layer.

FIG. 7 pertains to an example of a single layer 60 of material having at different locations through its thickness, different degrees of the properties of corrosion resistance, on the one hand, and participation in the electrochemical reaction and intimate association and cooperation with the positive-side active material. The single layer 60 comprises a lead-alloy having a decreasing proportion of alloying agent resistant to penetration corrosion (tin in this example) and an increasing proportion of alloying agent (antimony in this example) capable for forming an intimate interface with the positive-side active material proceeding through the layer from a surface 61 engaged with a supporting surface of core member 18 at the left side of the layer to the positive-side active material 14 at the right side of the layer. Thus, in FIG.

7 curve 62 is read with a % Sn scale 63 at the left side of FIG. 7 and curve 64 is read with a % Sb scale 65 at the right side of the same Figure. This variation in alloy composition yields the desirable simultaneous characteristics for the single thickness of decreasing corrosion resistance, and of increasing participation in the electrochemical reaction and increasing capability to fuse and form an intimate interface with the positive-side active material the further a unit volume of the layer lies from structural core 18 to the positive-side active material 14. Although layer 60 comprises varying mixtures of lead-tin and lead-antimony, other materials in addition to or in substitution for those alloying metals may be used to define a differentially alloyed layer having the desired properties.

A differentially alloyed electrode layer, such as layer 60, can be defined by applying the dopant (i,e,. alloying metal) by diffusion processes with different dopant materials to the opposite surfaces of a host metal (e.g., lead) layer of desired thickness. The differentially alloyed layer then can be affixed to an electrode structural core member to fully cover the core member surface by use of any suitable procedure or process, a metal cladding process performed in a reducing environment being preferred.

Workers skilled in the art and science of battery design and manufacture will readily appreciate that an electrode construction according to the foregoing description of electrode constructions 12 and 29, or of an electrode in supporting the differentially alloyed electrode layer 60 represented in FIG. 7, has particular utility in a bipolar battery. The electrode has exterior surfaces defined of materials which cooperate efficiently and effectively with suitable positive and negative active materials so that the desired galvanic processes can occur at the opposite sides of the electrode. The core of the electrode can be defined by any suitable constructive material, preferably a common metal, which is strong yet relatively light and which has other desired properties such as compatibility with the processes used to reclaim and recycle the materials used to manufacture the electrode in the first instance. The material of the core member can be selected and defined principally in terms of the functions the core member is to serve in the electrode without regard to how that material may react with or be attacked by the electrolyte to be used with the finished electrode. The destructive and corrosive galvanic (electrochemical) processes of the battery occur at the positive side of the electrode, and the electrode can be defined to cause those processes to occur efficiently.

Further, workers skilled in that same art and science will understand the role played during the useful life of the electrode by the electrode layer intermediate the core member and the positive face of the electrode. That role in illustrated in the series of views of FIGS. 6(*a*) through 6(*e*) in the accompanying drawings. It is well known that the corrosive galvanic processes productive of electron release do not occur truly uniformly across the surface between, for example, lead and lead dioxide in the presence of an electrolyte such as, for example, sulfuric acid; on a macroscopic level the corrosion process may be perceived to be uniform, but at a local or microscopic level that is not the case. The reason is that the metal or other conductive material which carries the battery positive active material is not truly homogeneous and amorphous. It has local differences due to impurities, crystal structural, grain orientation and other factors, most of which are known and understood. As a consequence, the corrosive positive galvanic process occurs more actively and vigorously at some places along that electrode surface than at other places. The results is that pits develop at local sites on the active material surface and propagate through the material defining that surface more rapidly than at other places in that material. Those local pitting phenomena are treated statistically, i.e., on average basis, in the design of a battery of given kind intended for a specific purpose or for general purpose use. That is, no storage battery relying on galvanic processes is permanent or life-limitless; all such batteries have a design life expectancy and, like people, some live longer than others, but on average they have a defined life. Therefore, workers skilled in the art and science to which this invention pertains will appreciate that this invention exists within the context of that reality. That reality has more dire implications and consequences in a bipolar battery than in a monopolar battery. In a bipolar battery, the biplates are serially arranged, and the corrosive penetration of a biplate by the battery electrolyte results in rapid failure of the pair of cells separated by that biplate. On the other hand, in a monopolar battery in which separate positive and negative electrodes are interdigitated within a given cell (and plural cells are serially connected to achieve a desired voltage), the corrosive penetration of a single positive electrode does not cause the cell to fail catastrophically but merely to suffer a gradual reduction in performance, and such reduction in performance within a cell of a monopolar battery does not significantly burden other cells in the battery. In a bipolar battery, however, the catastrophic failure of a pair of cells by reason of electrolytic penetration of the biplate between them causes the internal resistance of the battery to rise. That increase in internal resistance sufficiently burdens other cells in the same battery that their mortality rate rises. Thus, once one biplate in a bipolar battery fails, the degenerative illness to which all galvanic battery are inherently subject shifts, in effect, to a higher gear and the entire battery soon fails in a relatively short time. That overall failure, if it occurs suddenly, could place the user of the battery at risk or at a significant disadvantage. On the other hand, if a bipolar battery fails more gradually and predictably, the user has time, more or less at his convenience, to replace the battery and avoid that risk or inconvenience. This invention, for the reasons set forth alone, assures that the failure of a bipolar battery, usually toward the end of its design life, will occur gradually and predictably rather than suddenly.

The several views of FIGS. 6(*a*) through 6(*e*) depict a localized area of a biplate according to this invention at substantially regular intervals over the life of the biplate, illustrating the difference in corrosion potential between the interface layer 22 and the corrosion resistant layer 20.

FIG. 6(*a*) shows a cross-sectional view of the biplate comprising a core member 18, a corrosion resistant layer 20, an interface layer 22, and a positive-side active material 14. FIG. 6(*a*) shows the biplate at a point in time when the interface layer 22 has just begun to corrode and form lead dioxide ($PbO_2$) which combines with the positive-side active material 14.

FIG. 6(*b*) depicts the same area of the electrode plate at a point in time when the interface layer has been substantially corroded. FIG. 6(*c*) depicts the same area of the electrode plate after an equivalent interval of time, illustrating the through corrosion of the interface layer such that positive-side active material 14 is extending to the surface of the corrosion resistant layer 22. FIG. 6(*d*) depicts the same area of the electrode plate after an equivalent interval of time, illustrating the initial corrosion of the corrosion resistant layer. Like the interface layer, the corrosion product of the corrosion resistant layer is lead dioxide which combines with the positive-side active material layer 14.

Figure 6A:
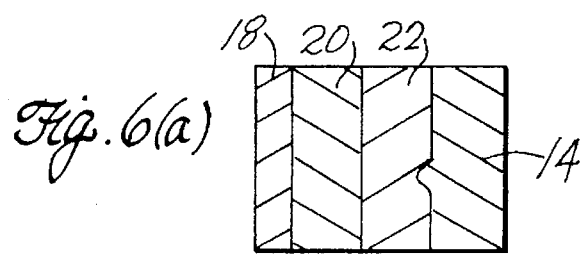
FIGS. 6(a) through 6(e) are a series of enlarged cross-sectional views of an electrode plate illustrating successive stages in the corrosion of the electrode plate during its useful life.
Figure 6B:
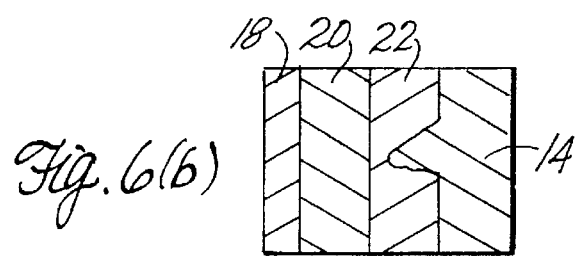
Figure 6C:
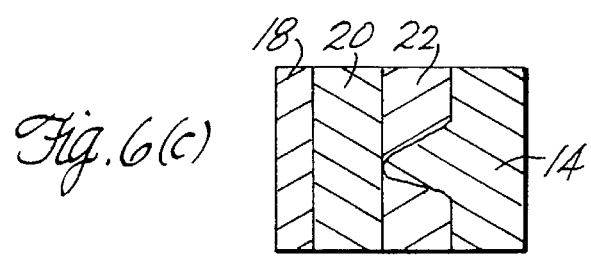
Figure 6D:
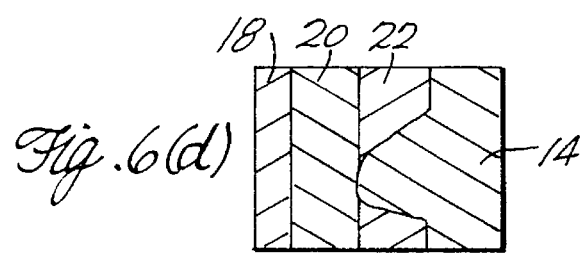

FIG. 6(d) shows the difference in corrosion potential between the corrosion resistant layer and the interface layer. Specifically, the superior corrosion resistance of the corrosion resistant layer is illustrated by it registering only a marginal degree of corrosion loss when compared to the significant corrosion loss registered by the interface layer the interface layer as measured from the time of FIG. 6(c).

Figure 6E:
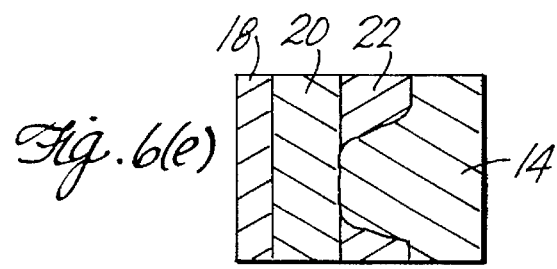

FIG. 6(e) depicts the electrode plate after an equivalent interval of time, and clearly illustrates the large difference in corrosion potential between the interface layer 22 and the corrosion resistant layer 20. Similar to FIG. 6(d), the superior corrosion resistant properties of the corrosion resistant layer is shown by its marginal corrosion loss when compared to the significant decrease in area registered by the interface layer as measured from the time of FIG. 6(d).

As noted above, another problem long known to exist with storage batteries is that of effectively sealing a conductive battery component to a battery housing at a connection of the component to the housing so that electrolyte cannot leak through the connection. That problem becomes acute in bipolar batteries where each biplate must be sealed along its perimeter to other battery components to define a chamber on each side of the biplate from which electrolyte cannot leak around the biplate to an adjacent chamber or to the exterior of the battery. This invention addresses that problem in the ways shown in FIGS. 8, 9 and 10.

An electrode plate 12, e.g., according to the present invention comprises a protective coating along its perimeter edge and on the whole of a peripheral portion of each opposite face of the plate as shown in FIG. 2. That coating covers deoxidized areas on the surfaces and edges of the electrode plate. If the protective coating is to be used to form an electrolyte seal about the peripheral portion of the electrode plate the coating must be oxygen impermeable, chemically and electrochemically inert, and be capable of interacting with a nonconductive battery member to form an electrolyte-tight seal. The protective coating is applied to the edges and the peripheral margin of both the positive and negative sides of the electrode plate preferably before the positive and negative active materials are applied to the electrode plate, for the purpose of eliminating electrolyte migration that can occur along a surface of a conductive member of a battery, where the surface is corroded by the battery electrolyte, as the conductive member extends through or to the battery's outside surface.

While not wishing to be bound to any particular theory, it is believed that the migration of battery electrolyte across the surface of a conductive member is caused two different corrosion mechanisms, creep corrosion and crevice or nodular corrosion. These corrosion mechanisms are well known in the art and were the topic of a paper entitled "Vulcanized Rubber Post Seal For Lead-Acid Batteries A New Generic Type" presented at the 1988 Intelec International Telecommunications Energy Conference. Both types of corrosion are believed to occur at the surface of the conductive member which is connected to a nonconductive battery member or the housing of the battery. This corrosion is believed to occur in the presence of an oxide film at the surface of the conductive member, which film enables the development of porous microscopic irregularities on the surface of the conductive member. It is believed that the presence of these irregularities facilitates the migration of electrolyte along that surface, as by capillary action through the oxide film itself and in other ways, and prevents the formation of an electrolyte-tight seal by known methods other than by intimate interaction of the conductive battery member and the nonconductive battery member by extreme pressure.

Figure 8A:
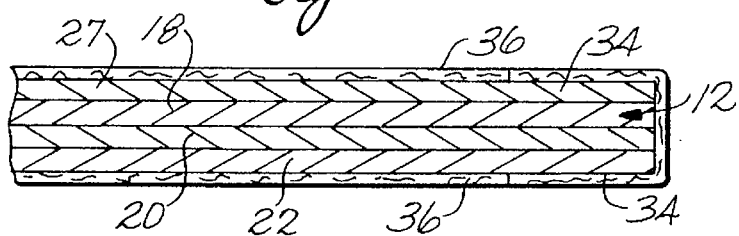
FIGS. 8(a) through 8(e) are enlarged cross-sectional views illustrating progressive steps in a method practice of this invention for providing an electrolyte-tight seal about the peripheral portion of an electrode plate.

This invention provides an electrolyte-tight seal without reliance upon the application of extreme pressures to form a connection of biplate according to this invention to an adjacent nonconductive component of a bipolar battery. It does so by removing the oxide film from the surfaces of the biplate via which connection to other battery components are to be made, and then coating the deoxidized surface with an oxygen impermeable protective coating. One method of preparing a biplate 12 for effective leak proof connection to another battery component, such as insulating frame member 30 (see FIG. 5) is illustrated in FIGS. 8(a) through 8(e). FIGS. 8(a) through 8(e) are cross-sectional views of electrode plate 12 at an adjacent one edge of the plate. FIG. 8(a) illustrates the electrode plate as manufactured before treatment to apply a protective coating 42.

All metals oxidize when exposed to oxygen or to air which contains oxygen. Depending on the metal, the oxide forms more or less rapidly and to varying thickness. As a consequence, biplate electrode 12 necessarily will have a film of oxide on all exposed surfaces when its manufacture, as described above, has been completed. That oxide covering is depicted in FIG. 8 as oxide film 36. Some portions of that film are desirable, notably those portions which cover the areas of the biplate which are to be contacted by the battery active materials, notably the positive active material which, in the case of biplate 12, is lead dioxide itself. However, in marginal areas 34 of the plate surface, where the biplate is to be connected between a pair of insulating frames 30, that oxide film is very undesirable.

Figure 8B:
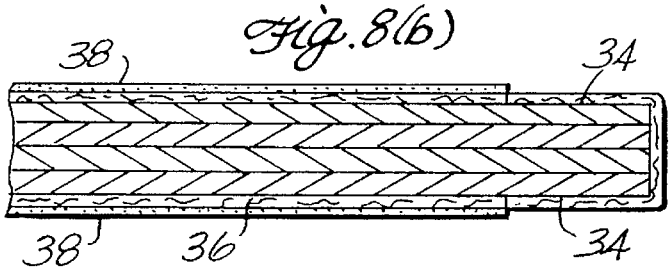
Figure 8C:
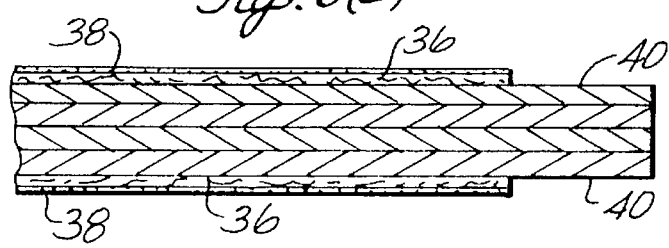
Figure 8D:
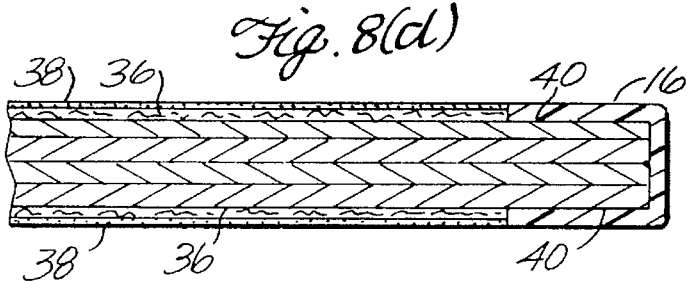

As shown in FIG. 8(b), the surfaces of the biplate where the presence of oxide film 36 is not undesirable are coated with a masking layer, but areas 34 and the edges of the biplate are not masked. The masking layer is formed of a material which is inert to a reducing environment. Then, as depicted in FIG. 8(c), the masked biplate is placed in a suitable reducing environment which is free of any and all forms of oxygen which can react with the materials of the biplate to form oxides of those materials. The reducing environment removes oxide film 36 from all areas of the biplate which are not covered by masking material 38, thus to provide oxide free areas 40 at the plate margins and edges.

Figure 8E:
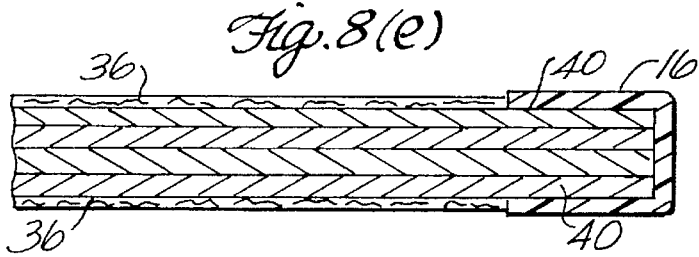

Next, while the biplate continues to be in a reducing or oxygen-free environment, a layer of an oxygen impermeable material, that is both chemically and electrochemically stable and capable of joining with the battery housing or nonconductive battery member to form an electrolyte-tight seal, is applied to areas 40 and to the biplate edges to form on those areas and edges a coating 16 which protects those deoxidized surfaces from contact by oxygen or by compounds containing oxygen in a form capable of reacting with the biplate materials to form oxides of them. Thereafter, as shown in FIG. 8(e), masking material 38 is removed from the surfaces of the biplate inside now-protected areas 40 to expose those surfaces.

The method step of removing oxide film 36 can be achieved by using well known commercial processes such as immersing the electrode plate in a chemical reducing agent. The coating step (FIG. 8(d)) preferably is performed in a non-oxidizing atmosphere such as in a vacuum or in a nitrogen atmosphere in order to prevent the reformation of an oxide film on the unmasked electrode plate surfaces. The elimination of oxides from the sealing areas of the electrode plate is important to prevent electrolyte migration across the plate surface caused by the phenomenon of nodular crevice corrosion, and thus provide an electrolyte-tight seal.

Protective coating 16 can be formed of any suitable material that forms an oxygen barrier, is chemically and electrochemically stable, is electrically nonconductive and capable of joining with the battery housing or nonconductive battery member to form an electrolyte-tight seal. Preferred protective coating materials may include lacquers, polymers, rubbers, plastics, silicones, adhesives, rubber cements and the like, provided they are compatible with the further processes to which the electrode plate is subjected in the further manufacture of battery 10. The coating material can be a material, such as a heat activatable adhesive, which participates directly in the definition of the seal or connection ultimately desired.

Figure 9:
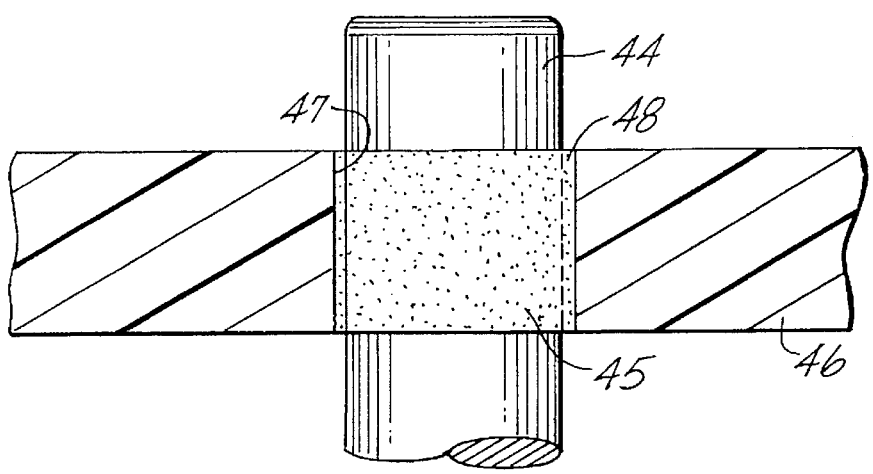
FIG. 9 is a cross-sectional view of another embodiment of the method for providing an electrolyte-tight seal.
Figure 10:
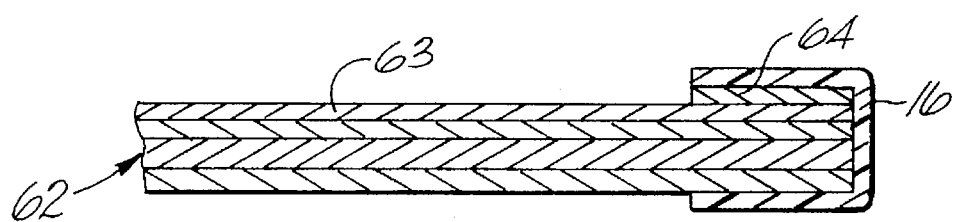
FIG. 10 is a fragmentary cross-sectional elevation view illustrating another method for providing an electrolyte-tight seal at a marginal edge of an electrode plate for a bipolar battery.

Although the method of accomplishing an electrolyte-tight seal between a conductive battery member and another battery member has been described in reference to an electrode plate used to construct a bipolar battery, this method applies to conventional monopolar batteries as well. For example, the method of this invention may be applied to accomplish a electrolyte-tight seal between a battery terminal and a battery housing of a conventional monopolar lead acid battery. FIG. 9 illustrates a battery terminal 44 and its interconnection to a battery housing 46 as it passes from a position within the battery, where it is in intimate contact with the battery electrolyte, to a position outside the battery. At least a portion of the outer surface of terminal 44 which lies within a desired seal zone between itself and the battery housing is circumferentially deoxidized and protectively coated, as at 45, in the manner described above. After assembly of the battery housing cover to the battery housing, an annular space between the terminal and an aperture 47 in the housing cover can be filled with a suitable sealant 48 to create a seal which is secure against leakage of the electrolyte.

It has been found that certain alloys of lead, for example, develop oxide coatings which are difficult to remove by chemical reduction, reducing atmospheres or abrasion in oxygen-free atmospheres. One such alloy is lead-antimony alloy. In that instance, it is the tightness of the bond of the surface oxide film to the underlying alloy which makes such an alloy useful on the positive surface of a battery electrode; that oxide layer facilitates the desired intimate contact and cooperation with lead dioxide as a battery positive active material. If the instance of lead-antimony alloys, and also other alloys which develop tightly bound oxide films, the oxide film can be removed by the use of a flux. Therefore, with reference to FIG. 10, a presently preferred procedure for preparing edge margins of an electrode biplate 62 having a surface layer 63 of lead-antimony alloy is to apply a layer 64 of lead-alloy solder (i.e., 50/50 lead-tin) to the margin of that surface in the presence of a flux, preferably a rosin-type flux. The solder can be applied in air. As the solder is applied, to flux removes the topical oxide layer from the lead-antimony and the solder immediately wets and covers the oxide free surface. As the solder solidifies on the biplate margin, it develops its own oxide coating, but that oxide layer is readily removed in the ways described above, e.g., by application of a reducing atmosphere to enable coating 16 to be applied to bare metal at the biplate margin and edges.

In certain instances it may be desirable to form a temporary oxygen impermeable coating on the surface of a conductive metal used in battery construction. Such a temporary oxygen barrier may be formed by applying a rosin flux to the surface area of the conductive member to be protected. The flux acts to remove the topical oxide layer and forms an oxide impermeable coating over the newly deoxidized surface. This protective coating is temporary in nature because the flux is neither chemically nor electrically stable. Accordingly, before the conductive member is used in the construction of a battery the temporary coating is removed by known methods and substituted with a permanent coating that is oxygen impermeable, chemically and electrochemically stable, and capable of interacting with the battery housing or nonconductive battery member to form an electrolyte-tight seal.

The method of obtaining an electrolyte-tight seal according to this invention is not limited to the construction of bipolar, monopolar, or even lead-acid batteries. It is useful to eliminate the migration of battery electrolyte that may occur along or around a conductive battery member that extends to or through the outside surface of the battery or which lies wholly within the battery and is to be sealed to an adjacent insulative battery component.

Figure 5:
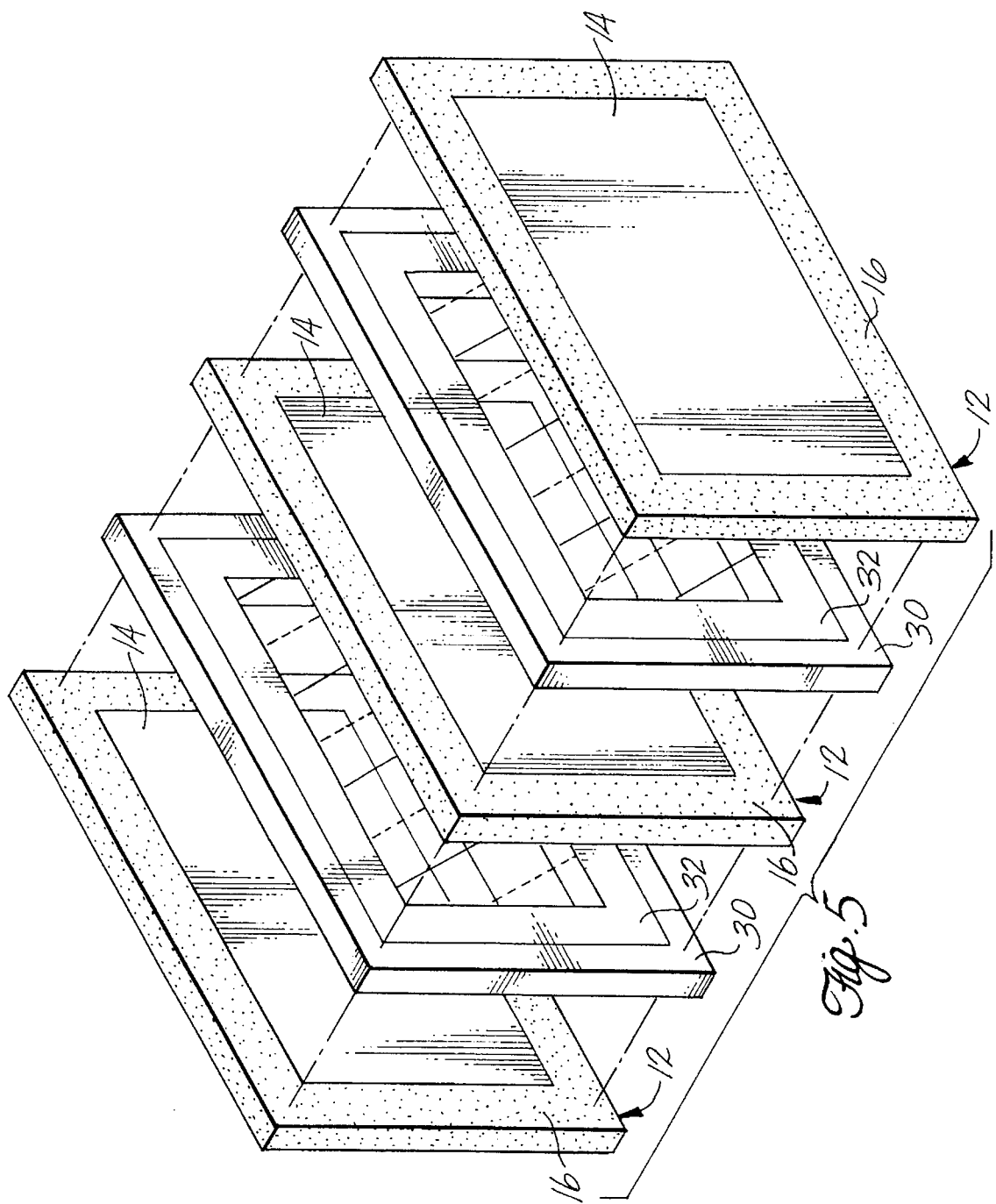
FIG. 5 is an exploded perspective view illustrating the interrelationship of an electrode plate with other battery components in the construction of a bipolar battery.

FIG. 5 illustrates the relationship and cooperation of an electrode plate according to this invention with other battery components used in the construction of bipolar battery 10. Three electrode plates 12 are arranged in serial fashion. A nonconductive frame-like insulating member 30 carrying a separating member 32 is interposed between each adjacent pair of electrode plates. In constructing the battery, the electrode plates and the insulating members are sandwiched together in intimate contact with each other at their margins where they can be bonded together by a suitable adhesive. The adhesive is applied to the deoxidized and protectively covered marginal surface of the electrode plate.

When the battery components are so sandwiched together, the outside edges of the electrode plates and the insulating members cooperate to define the outside surfaces of bipolar battery 10. Accordingly, since each bipolar cell contains electrolyte and each electrode plate is in intimate contact with the electrolyte, it is necessary that the joint between each electrode plate and the adjacent insulating members be electrolyte tight. To accomplish this, the electrode plates 12 each comprise a protective coating 16 that covers the edge and periphery of the electrode plate in a manner that overlaps and mates with the adjoining surface area of each insulating member 30.

Separating members 32 are used in the construction of bipolar battery 10 to ensure that each biplate is physically separated from and does not contact an adjoining biplate. As illustrated in FIG. 5, the separating member may be configured to fit within the inside perimeter of each insulating member 30. The main requirement for a separating member is that it be nonconductive to electricity and permit ion transfer to occur through it between adjoining biplates.

EXAMPLE OF THE PREFERRED EMBODIMENT

An electrode plate was constructed according to the practice of this invention having a core member made from iron. The core member was configured in the shape of a flat rectangular sheet having a thickness of approximately 0.4 millimeters. A first corrosion resistant layer having a thickness of approximately 0.8 millimeters and comprising approximately 96.7 percent by weight lead, 3 percent by weight tin, and 0.3 percent by weight silver was joined to one surface of the core member by a commercial cladding process. A second corrosion resistant layer having the same thickness of the first corrosion resistant layer and comprising approximately 98 percent by weight lead, 1 percent by weight tin, and 1 percent by weight antimony was applied to the surface of the first corrosion resistant member by the same cladding process used to apply the first corrosion resistant layer.

A layer of interface material having a thickness of approximately 0.13 millimeters and comprising approximately 96.2 percent by weight lead, 3 percent by weight antimony, and 0.8 percent by weight tin was applied to the surface of the second corrosion resistant layer by the same cladding process used to apply the corrosion resistant layers. A layer of positive-side active material comprising lead dioxide was applied using conventional methods known in the art to the surface of the interface material.

A thin pure lead foil having a thickness of approximately 0.1 millimeters was applied to the surface of the core member opposite the positive-side active material by commercial cladding process. A layer of negative-side active material comprising sponge lead was applied using conventional means known in the art.

The foregoing description of presently preferred and other aspects of this invention has been presented by way of illustration and example. It does not present, nor is it intended to present, an exhaustive catalog of all structural and procedural forms by which the invention can be embodied. Variations upon and alterations of the described structure and procedure can be pursued without departing from the fair substance and scope of the invention consistent with the foregoing descriptions and the following claims which are to be read and interpreted liberally in the context of the state of the art from which this invention has advanced.

What is claimed is:

1. An electrode for an electrochemical battery in which the electrode is to participate with an electrolyte in an electrochemical reaction, the electrode comprising;

a conductive structural electrode core member;

a conductive interface material by for contact by and corrosive participation with a positive salve material in an electrochemical reaction in the presence of the electrolyte;

a conductive protective material carried by the electrode core member and carrying the interface material and which resists corrosion to a greater extent than the interface material, which participates in the desired electrochemical reaction less actively than the interface material and which can form an intimate relation with the positive active material.

2. The electrode as recited in claim 1 wherein the protective material comprises at least one corrosion resistant layer, the corrosion resistant layer being in intimate contact on one side thereof with a surface of the core member, and in intimate contact with the interface material on an opposite side thereof.

3. The electrode as recited in claim 2 wherein the protective material comprises a plurality of discrete corrosion resistant layers, each successive layer being in intimate surface contact with a previous layer, the plurality of layers being disposed between the core member and the interface material, each successive layer having the properties of resisting corrosion to a lesser extent than and participating in the desired electrochemical reaction to a greater extent than the layer adjacent to it toward the electrode core member.

4. The electrode as recited in claim 1 wherein the interface and protective materials are comprised by a single thickness of a material that is in intimate surface contact with the core member on one side thereof and is engagable by a positive active material on an opposite side thereof, the material of the single thickness exhibiting differentially through it the properties of corrosion resistance, electrochemical participation, and the capacity to intimately engage the positive active material to different degrees at different locations from the electrode core member.

5. The electrode as recited in claim 4 wherein the material of the single thickness exhibits decreasing corrosion resistance and increasing participation in the electrochemical reaction progressing through the thickness from the electrode core member.

6. An electrode for an electrochemical battery in which the electrode is to participate with an electrolyte in an electrochemical reaction, the electrode comprising;

a structural electrode core member formed by a material which is conductive and readily corrodible by the electrolyte;

a conductive interface material for contact by and corrosive participation with a positive active material in the desired electrochemical reaction in the presence of the electrolyte;

a conductive intermediate body interposed between the electrode core member and the interface material and which resists corrosion to a greater extent than the interface material, which participates in the desired electrochemical reaction less actively than the interface material and which can form an intimate relation with the positive active material.

7. An electrode for an electrochemical battery in which the electrode is to participate with an electrolyte in an electrochemical reaction, the electrode a conductive electrode core member;

a conductive corrosion resistant body in intimate contact on one side thereof with a surface of the core member;

a conductive interface body in intimate contact with an opposite side of the corrosion resistant body, the interface body being comprised of a material which is both capable of participation with the electrolyte in the electrochemical reaction and of forming an intimate relation with a positive-side active material applied to it;

the corrosion resistant body being defined of a material which can participate in the electrochemical reaction with the electrolyte at a lower level of activity than the interface body; and a conductive negative-side active material carrier in intimate contact with a surface of the core member opposite the corrosion resistant body.

8. The electrode as recited in claim 7 wherein the core member comprises a material that is both structurally rigid and electrically conductive.

9. The electrode as recited in claim 8 wherein the corrosion resistant body comprises a material having the simultaneous properties of being corrosion resistant and participating in the electrochemical reaction, the interrelationship of these properties varying inversely between the sides of the resistant body as a function of distance in the body from the core member.

10. The electrode as recited in claim 7 wherein an additional corrosion resistant body is in intimate contact with and disposed between the corrosion resistant body and the interface body, the additional corrosion resistant body comprising a material that is corrosion resistant to a lesser extent than the first corrosion resistant body and participates in the electrochemical reaction to a greater extent than the first corrosion resistant body.

11. The electrode as recited in claim 10 wherein the material of the first corrosion resistant body is selected from the group of lead and alloys of lead wherein the alloy materials are selected from the group consisting of tin, indium, calcium, aluminum, antimony, and silver.

12. The electrode as recited in claim 11 wherein the material of the additional corrosion resistant body is selected from the group of lead and alloys of lead wherein the alloy materials are selected from the group consisting of tin, indium, calcium, aluminum, antimony, and silver.

13. The electrode as recited in claim 11 wherein the tint corrosion resistant body is lead-tin alloy comprising in the range of from 0.01 to 5 percent by weight tin.

14. The electrode as recited in claim 13 wherein the additional corrosion resistant body is lead-tin alloy comprising in the range of from 0.01 to 3 percent by weight tin.

15. The electrode as recited in claim 7 wherein the interface body is lead alloyed with antimony.

16. The electrode as recited in claim 7 wherein the negative-side active material carrier is lead.

17. The electrode as recited in claim 7 wherein the material of the core member is selected from a group consisting of carbon steel, copper, aluminum, iron, stainless steel, graphite prepreg, ceramics, metal epoxies, metal polyolefins, metal thermoplastics, metal thermosets, metal polycarbonates, and polymer composites with conductive additives of $SnO_2$, $Ti_4O_7$.

18. An electrode plate for an electrical battery in which the electrode is to participate with an electrolyte in an electrochemical reaction, the electrode plate comprising;
   an electrode core member that is structurally rigid and electrically conductive;
   at least one corrosion resistant layer comprised of a material that resists corrosion by the electrolyte and participates in the electrochemical reaction in the presence of the electrolyte, the corrosion resistant layer intimately engaging with a surface of the core member;
   a layer of interface material capable of participation in the electrochemical reaction in the presence of the electrolyte, the interface layer comprising lead-antimony alloy and intimately engaging with a surface of the corrosion resistant layer;
   a positive-side active material capable of participation in the electrochemical reaction, the positive-side active material being lead dioxide in intimate contact with the interface layer; and
   a negative-side active material capable of participation in the electrochemical reaction, the negative-side active material being sponge lead in intimate conductive relation to the surface of the core member opposite the positive-side active material.

19. The electrode as recited in claim 18 wherein the electrode comprises first and second corrosion resistant layers comprised of material selected from the group of lead and alloys of lead wherein the alloy materials are selected from the group consisting of tin, indium, calcium, aluminum, antimony, and silver, the first corrosion resistant layer being in intimate contact on one side thereof with a surface of the electrode core member and interposed between the core member and the second corrosion resistant layer, the second corrosion resistant layer being in intimate contact with an opposite of the first corrosion resistant layer and interposed between the first corrosion resistant layer and the interface layer.

20. The electrode as recited in claim 19 wherein the first and second corrosion resistant layers are lead-tin alloy, the first corrosion resistant layer comprising in the range of from 0.01 to 5 percent by weight tin, the second corrosion layer comprising in the range of from 0.01 to 3 percent by weight tin.

21. The electrode as recited in claim 20 wherein the first corrosion resistant layer comprises approximately 3 percent by weight tin and the second corrosion resistant layer comprises approximately 1 percent by weight tin.

22. The electrode as recited in claim 21 wherein the interface layer is lead including in the range of from 0.2 to 15 percent by weight antimony.

23. The electrode as recited in claim 22 wherein the interface layer comprises approximately 1 percent by weight antimony.

24. A method for making an electrode for an electrolytic storage battery which uses an electrolyte to produce an electrochemical reaction with the electrode, the method comprising the step of conductively interposing between a conductive electrode structural core member and a conductive body of material which participates actively with the electrolyte in the desired reaction an intermediate quantity of a conductive material which participates less actively with the electrolyte in the reaction.

25. A method for preparing, for leak-resistant sealing to a component of a housing of an electrolytic storage battery, a conductive member which is to extend from a position within the battery in intimate contact with a battery electrolyte into a seal zone with a nonconductive component of the battery, the method comprising the steps of;
   deoxidizing at least a portion of an external surface of the conductive member which lies within the seal zone;
   coating the deoxidized area of the member with a material which adheres securely to the member and which is impervious to the passage of oxygen therethrough; and
   performing the deoxidizing and coating steps in an environment free of oxygen in a form which can produce an oxide layer at the surface of the conductive member.

26. The method as recited in claim 25 wherein the steps of selectively deoxidizing and coating the deoxidized area of the conductive member are accomplished by masking the portion of the conductive surface that lies outside the seal zone.

27. The method as recited in claim 26 wherein the coating material is selected from the group consisting of lacquers, rubbers, plastics, silicones, has been adhesives.

28. The method as recited in claim 27 wherein a leak resistant seal is established between the conductive member and an interfacing battery member via the coated area of the conductive member.

29. The method according to claim 25 wherein removing oxides from at least the portion of the conductive member includes applying a solder thereto in the presence of a flux thereby to form over said area a layer of solder which makes metal-to-metal contact with the conductive member, and performing the deoxidizing and coating steps on the solder layer.

30. The method according to claim 25 wherein removing oxides from at least the portion of the conductive member includes applying a flux thereby to form over said area a layer of flux which serves to deoxidize the conductive member surface and forms an oxide impermeable coating over the deoxidized surface.

31. A method for achieving an electrolyte-tight seal in a lead-acid storage battery about conductive battery members in intimate contact with the battery electrolyte that extend through the body of the battery to its outside surface, the method comprising the steps of;
   deoxidizing a portion of a surface area of a conductive battery member that lies within a seal zone by contacting the member by a reducing agent;
   washing and drying the surface area of the deoxidized conductive battery member;
   applying a protective coating to the portion of the deoxidized surface of the conductive member surface that lies within the seal zone;

performing the deoxidizing, washing and applying steps in an environment free of oxygen in a form which can produce an oxide layer on the member; and assembling the battery in such a manner that the portion of the conductive battery member carrying the protective coating is placed in direct contact with a non-oxidizable battery component defining the seal zone.

32. An electrode unit for a bipolar electric storage battery, the unit including a substrate having opposite metallic surfaces, and characterized in that the substrate surfaces have peripheral margins which are free of oxides and are coated with a material which is impervious to the passage of oxygen therethrough.

33. An electrode unit according to claim 32 wherein the material used to coat the metallic surfaces is chemically stable, electrochemically stable, and is capable of interacting with a battery housing or a nonconductive battery member for the purpose of forming an electrolyte-tight seal.

34. An electrode unit according to claim 33 wherein one of the metallic surfaces is defined by a lead-antimony alloy, the peripheral margins of that surface carry a layer of lead-tin solder, which layer is oxide free on its side opposite from that surface and is coated by the material which is imperious to the passage of oxygen through it.

* * * * *

UNITED STATES PATENT AND TRADEMARK OFFICE
CERTIFICATE OF CORRECTION

PATENT NO. : 5,593,797
DATED : January 14, 1997
INVENTOR(S) : William B. Brecht

It is certified that error appears in the above-indentified patent and that said Letters Patent is hereby corrected as shown below:

On the title page, Item 87, the PCT Pub. No. should read -- WO/19837 --.
Column 19, line 33, change "salve" to -- active --.

Column 20, line 14, before "electrochemical" delete "desired".
Column 20, line 19, after "in the" delete "desired".
Column 20, line 24, after "electrode" insert -- comprising; --.
Column 21, line 4, replace "tint" with -- first --.
Column 22, line 12, before "reaction" delete "desired".
Column 22, line 36, replace "has been" with -- and --.

Signed and Sealed this

Tenth Day of February, 1998

Attest:

BRUCE LEHMAN

*Attesting Officer*     *Commissioner of Patents and Trademarks*